UNITED STATES PATENT OFFICE.

GUY S. McDANIEL, OF SMYRNA, GEORGIA, ASSIGNOR OF ONE-HALF TO E. H. KIMBELL, OF ATLANTA, GEORGIA.

PROCESS OF TREATING FIBROUS VEGETABLE MATERIAL AND THE RESULTING PRODUCT.

1,350,031.  Specification of Letters Patent.  Patented Aug. 17, 1920.

No Drawing.  Application filed July 24, 1919.  Serial No. 313,003.

*To all whom it may concern:*

Be it known that I, GUY S. McDANIEL, a citizen of the United States, residing at Smyrna, in the county of Cobb and State of Georgia, have invented a certain new and useful Process of Treating Fibrous Vegetable Material and the Resulting Product; and I do hereby declare the following to be a full, clear, and exact description of the same.

This invention relates to a process of treating fibrous vegetable material, especially green Spanish moss, for the production of so called vegetable hair, much used for example for stuffing mattresses, and for various upholstering purposes. Various methods have heretofore been employed for treating Spanish moss for the production of vegetable hair, all of them however embodying the idea of retting or rotting the outer covering or tegumen of the inner fiber so that it may be readily removed leaving only the inner fiber.

Such processes result in great loss in weight both in the green and partly cured moss, this loss at some seasons running as high as 88%. It is the object of the present invention to retain and utilize all of this previously wasted and lost matter and convert the same into a glazed coating for the inner fiber which will add weight, strength and resilience to the fiber.

By careful experimentation both in the chemical laboratory and in an actual plant under working conditions I have accomplished this desired result by the following process. Having first ascertained the organic acid content of the growing moss, which varies at different seasons of the year, I dip or spray the green moss in an alkali solution, preferably caustic soda the strength of which is in direct ratio to the organic acid content of the moss at the time of treatment. For example, green June moss treated within a few days of gathering, would require one part of 50° Bé. caustic soda to one hundred parts of water to point of saturation, while December moss would require a solution of one part of 50° Bé. caustic soda to 370 parts of water to point of saturation.

The action of the solution produces a chemical neutralizing action which converts the outer bark or covering of the moss into a hydrocellulose formation which does not disintegrate, and which is shrunk and set on the inner fiber. If desired a sufficient amount of logwood or alkaline dye may be added to the alkaline solution, both of which are well adapted to dye moss. It will be understood that the treatment is done in a cold solution or the average natural temperature of the water. After the moss has remained in the solution for about fifteen minutes or long enough to become thoroughly saturated it is removed and placed in a suitable drier. This drying completes the shrinking of the outer coating and produces a glaze thereon, the temperature of the drier expelling all excess moisture and permitting a maximum chemical reaction. Care must be taken not to subject the material to a temperature high enough to injure the glazed coating as the fiber as a whole might become too brittle. After drying, the material may be passed through a suitable gin or machine to remove sticks, twigs or other foreign matter and to give the material a fluffy feeling and appearance.

The product obtained by the above described process is stronger and more resilient than that produced by the former process of treating moss and has a brilliant glazed surface.

What is claimed is:

1. The process of treating Spanish moss which consists in subjecting the green partly cured or cured moss to an alkaline solution of specific strength whereby the outer coating is shrunk and set upon the inner fiber substantially as described.

2. The process of treating Spanish moss which consists in ascertaining the organic acid content of the moss, and subjecting it to an alkaline solution of a strength in direct ratio to said content.

3. The process of treating Spanish moss, which consists in subjecting it to a solution of caustic soda of specific strength, until thoroughly saturated and then drying.

4. The process of treating Spanish moss which consists in saturating the moss in a cold alkaline solution of specific strength, and then drying the same.

5. The process of treating Spanish moss, which consists in saturating the moss with an alkaline solution of proper strength containing a suitable dye and then drying the moss.

6. The process of treating Spanish moss which consists in saturating the moss with an alkaline solution of proper strength whereby the outer covering or bark is converted into a hydrocellulose condition, and is shrunk and set upon the inner fiber without injury thereto.

7. A new product consisting of Spanish moss having the outer bark shrunk and set upon the inner fiber.

8. A new product consisting of Spanish moss having the outer bark or covering converted into a hydrocellulose condition and set or shrunk upon the inner fiber.

9. A new product consisting of Spanish moss treated with an alkaline solution of a strength in direct ratio to the organic acid content of the green moss.

GUY S. McDANIEL.